US007255049B2

(12) United States Patent
Allan et al.

(10) Patent No.: US 7,255,049 B2
(45) Date of Patent: Aug. 14, 2007

(54) SUBSURFACE SOIL INJECTION METHOD

(75) Inventors: Michael A. Allan, Oakdale, CA (US); Charles T. Schiller, Alamo, CA (US)

(73) Assignee: Arysta Lifescience North America Corporation, San Francisco, CA (US)

( * ) Notice: Subject to any disclaimer, the term of this patent is extended or adjusted under 35 U.S.C. 154(b) by 0 days.

(21) Appl. No.: 10/163,295

(22) Filed: Jun. 7, 2002

(65) Prior Publication Data

US 2002/0148396 A1 Oct. 17, 2002

Related U.S. Application Data

(62) Division of application No. 09/794,062, filed on Feb. 28, 2001, now Pat. No. 6,990,912.

(51) Int. Cl.
*A01C 23/00* (2006.01)

(52) U.S. Cl. .................................................. 111/123

(58) Field of Classification Search ................ 111/118, 111/119, 120, 123, 124, 129

See application file for complete search history.

(56) References Cited

U.S. PATENT DOCUMENTS 2,637,979 A * 5/1953 Pool et al. .................... 222/55
2,646,012 A * 7/1953 Ingalls ....................... 111/124
3,185,117 A * 5/1965 Frantzen ..................... 111/124
3,610,184 A * 10/1971 Carroll et al. .............. 111/125
3,640,234 A 2/1972 Carroll et al.
3,707,132 A * 12/1972 Hansen ....................... 111/123
3,815,525 A * 6/1974 Kainson et al. ............. 111/127
3,863,842 A * 2/1975 McFarland et al. ......... 239/283
3,926,131 A * 12/1975 Collins ....................... 111/118
4,079,680 A * 3/1978 Davis ......................... 111/124
4,129,082 A 12/1978 Betulius
4,141,676 A * 2/1979 Jannen et al. ............... 417/539
4,624,193 A * 11/1986 Johnston ..................... 111/127
4,674,419 A * 6/1987 Kopecky ...................... 111/73
4,683,826 A * 8/1987 Solie et al. ................. 111/124
4,825,959 A * 5/1989 Wilhelm ..................... 172/720
4,903,618 A 2/1990 Blair (Continued)

FOREIGN PATENT DOCUMENTS

CH 356300 A 8/1961

(Continued)

OTHER PUBLICATIONS

Helping Flowers Fight Soil-Dwelling Foes, Trout et al., Sep. 2001, Agricultural Research magazine, pp. 1-5.*

(Continued)

*Primary Examiner*—Christopher J. Novosad
(74) *Attorney, Agent, or Firm*—Sughrue Mion, PLLC

(57) ABSTRACT

A method for the subsurface application of fertilizers, biologicals, fumigants, non-fumigant pesticides or other chemicals to soil with reduced application rates. Discrete amounts of the materials are injected into the soil at numerous sites along a path during a pass through the soil. At the injection sites, the materials form diffusion patterns which may touch or overlapping with diffusion patterns of adjacent soil injections. The application of materials to soil in this manner maintains optimum efficacy with the use of the least amount of materials necessary per acre of soil.

19 Claims, 4 Drawing Sheets

U.S. PATENT DOCUMENTS

| | | | | |
|---|---|---|---|---|
| 5,097,047 | A | 3/1992 | Stroech et al. | |
| 5,178,078 | A | 1/1993 | Pendergrass | |
| 5,271,567 | A | 12/1993 | Bauer | |
| 5,460,106 | A | 10/1995 | Crockett et al. | |
| 5,467,723 | A | 11/1995 | McIvor-Dean et al. | |
| 5,495,814 | A * | 3/1996 | Primus | 111/124 |
| 5,517,931 | A * | 5/1996 | Kawaguchi | 111/118 |
| 5,518,692 | A * | 5/1996 | Grech et al. | 422/37 |
| 5,605,105 | A * | 2/1997 | Clark et al. | 111/127 |
| 5,753,183 | A | 5/1998 | Ohr et al. | |
| 5,802,996 | A | 9/1998 | Baxter | |
| 5,890,445 | A | 4/1999 | Ridgley | |
| 5,913,368 | A * | 6/1999 | Horton et al. | 172/133 |
| 5,931,882 | A * | 8/1999 | Fick et al. | 701/50 |
| 5,967,066 | A * | 10/1999 | Giles et al. | 111/119 |
| 6,013,254 | A * | 1/2000 | Oremland et al. | 424/93.4 |
| 6,029,590 | A | 2/2000 | Arriola et al. | |
| 6,038,990 | A * | 3/2000 | Simpson | 111/124 |
| 6,167,821 | B1 | 1/2001 | Beggs | |
| 6,214,840 | B1 | 4/2001 | Assmann et al. | |
| 6,216,614 | B1 * | 4/2001 | Wollenhaupt | 111/118 |
| 6,294,584 | B1 * | 9/2001 | Bockowski et al. | 514/693 |

FOREIGN PATENT DOCUMENTS

| | | |
|---|---|---|
| NL | 7101023 A | 7/1972 |
| WO | WO 97/44127 A | 11/1997 |

OTHER PUBLICATIONS

The Status of MeBr Alternatives, Jul. 2002, internet article on ars.usda web site, pp. 1-6.*

* cited by examiner

SUBSURFACE SOIL INJECTION METHOD

This is a divisional of Application Ser. No. 09/794,062 filed Feb. 28, 2001 now U.S. Pat. No. 6,990,912; the disclosure of which is incorporated herein by reference.

BACKGROUND OF THE INVENTION

1. Field of the Invention

The present invention relates to apparatus and distinct methodology that will improve the delivery of iodomethane or an alternative substance including but not limited to fertilizer, fumigants, non-fumigant pesticides, biologicals and other chemicals (hereinafter "products") to prepare the soil for planting.

2. Description of the Related Prior Art

Methyl iodide is known for use as a soil fumigant. As described in U.S. Pat. Nos. 5,753,183, and 5,518,692, methyl iodide (hereinafter "iodomethane") has been used for the effective control of soil borne plant pathogens such as fungi, bacteria, viruses, nematodes, insects and arachnids (including eggs, larva, pupae and adults).

Also, there are devices and systems for applying substances or chemicals to soil. One such system is described in U.S. Pat. No. 6,029,590 which relates to an apparatus and method for the subsurface application of chemicals such as fertilizers, pesticides and fumigants in soil.

Known devices for application of chemicals to soil apply a constant stream of the material to the soil during a pass through the soil, either by spraying the material or applying it in some other constant manner. Thus, the fumigation equipment in use today distributes material in a continuous flow in a targeted area. Concomitantly, there is a large amount of the material applied to the target area. There is a need for a more efficient and accurate distribution of chemicals into the target soil area.

SUMMARY OF THE INVENTION

In accordance with the present invention, an apparatus is provided for introducing a discrete, predetermined amount of a material into soil at predetermined intervals in the soil. The apparatus includes a container for holding the material to be introduced into the soil, and tubing connected to the container at one end and having a distal end for introducing the material into the soil. One or more shanks are provided for placing the distal end of the tubing at a predetermined depth in the soil during introduction of the material into the soil. A switch (such as a solenoid switch) is provided for controlling flow of the material through the tubing. The switch is operable between an open state for introducing the discrete, predetermined amount of the material into the soil at a predetermined point in the soil, and a closed state when the shank is positioned between the predetermined points in the soil.

A method for applying a material to soil is also provided in accordance with the present invention. The method includes the step of introducing a discrete, predetermined amount of the material into the soil at predetermined intervals or distances along a linear path in the soil. The material diffuses into the soil from each point to provide diffusion patterns that may overlap dependent upon its targeted pest and crop (for example, tree and vine may not have overlapping patterns) in the soil.

DETAILED DESCRIPTION OF THE PREFERRED EMBODIMENTS

Figure 1:
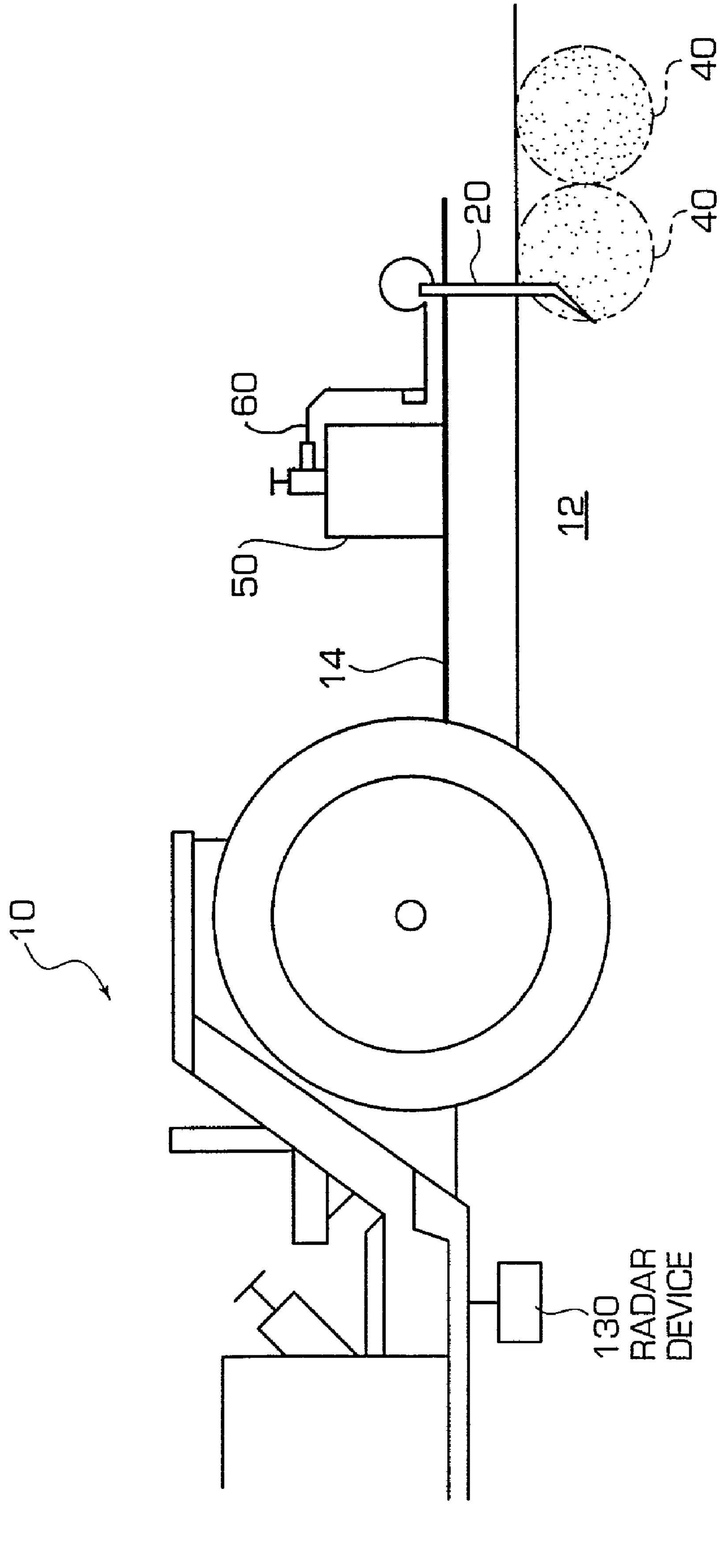
FIG. 1 is a side view of a tractor mounted system in accordance with the present invention.

In accordance with the present invention, a new method of application of products is provided that may achieve better delivery with more efficient and accurate distribution into the target soil area. Soil treatment by the method of the present invention should lower rates over what is currently used given the improved mechanism of delivery of the present invention. Compounds injected into the soil in accordance with the present invention include iodomethane, but the present invention is not limited to the application of iodomethane or even fumigants. Application of other compounds, such as fertilizers, biologicals, and non-fumigant pesticides, either alone or in combination with iodomethane are also within the scope of the present invention. For example, the apparatus and method of the present invention may be used to introduce the following chemical and biological materials into the soil: the fumigant chloropicrin (trichloronitromethane) available from Niklor Chemicals Mojave of Long Beach, Calif.; the fumigant Telone-35 (1,3-dichloropropene and 35% chloropicrin) available from Dow AgroSciences of Indianapolis, Ind.); the fumigant propargyl bromide (3-bromopropyne) available from Albermarle Corporation of Baton Rouge, La.; the liquid biological nematicide Ditera (a natural product from the hyphomycete fungus *Myrothecium* spp. composed primarily of proteins, sugars and lipids) available from Valent BioSciences of Libertyville, Ill.; the liquid Plant Pro 45 (3% iodine based ingredient) available from Ajay North America of Powder Springs, Ga.; the liquid fertilizer CAN-17 (calcium aluminum nitrate 17% solution) available from Prodica of Brea, Calif.; the liquid fertilizer UN-20 (nitrogen urea 20% solution) available from, among others, Soil Serve of Salinas, Calif.; and liquid *Bacillus subtilus* suspended in aqueous solution available from Agra Quest of Sacramento, Calif. Other chemical and biological materials such as *Pseudomonas* sp. suitable for injection into soil in accordance with the present invention will be apparent to one skilled in the art. The material introduced into the soil in accordance with the present invention may be either a liquid or gas.

Materials introduced into the soil in accordance with the apparatus and method of the present invention which include a volatilizing ingredient, such as fumigants, will form a diffusion pattern that advantageously spreads out in all directions from the injection site. Materials such as fertilizers which do not contain a volatilizing ingredient, are typically placed at or near the root zone of the plant. In accordance with the apparatus and method of the present invention, these types of materials may be precisely placed at this location. Thus, while these types of materials lack a volatilizing ingredient, they can be precisely placed within the root zone and form a desired diffusion pattern, albeit not in all directions through the soil. Thus, the user may introduce material into soil in accordance with the present invention to form diffusion patterns of the material in the soil at adjacent injection points which touch, overlap or are intermittent, i.e., are not touching at all, as desired.

The invention is described herein in connection with the soil fumigant iodomethane. As discussed above, however, it being understood that the present invention is not limited to the introduction of solely this material into soil.

Efficacy testing using known application equipment with iodomethane has shown irregularities in product distribution within the soil. In this regard, conventional flow meters, tubing and orifice sizing and a radar equipped digital system have shown to be unreliable in accurate and consistent delivery of a target rate (gal/treated acre, lb/treated acre, or liters/treated hectare) to the soil applied by multiple types of shanks (either flat/broadcast or bed shank). Fluctuations in the known systems of delivery when applying iodomethane (in contrast to the application of methyl bromide, another fumigant being phased out because of environmental regulations) are thought to be in part the result of differences in the physical properties between iodomethane and methyl bromide. Conventional equipment is specific to a single chemical (for example, methyl bromide) and does not provide adequate crossover for use with other materials. For example, the density of iodomethane is 2.3 g/L, while the density of methyl bromide is 1.7 g/L. In any event, fluctuations in delivery of the fumigant results in either too much or too little compound being applied and/or irregular patterns of material being distributed in the treatment area.

In accordance with the present invention, problems in fluctuation of application of iodomethane using conventional systems are avoided. A single injection point in accordance with the present invention will have a maximum distribution or diffusion pattern ("affected treatment area") in the soil of the applied chemical or chemicals that if desired, touches or overlaps with diffusion patterns from adjacent injections In accordance with the present invention, the amount of material introduced into the soil for treatment thereof may be reduced. In this regard, the diffusion pattern can be determined for a given fumigant in a given soil type with single injection points at equal intervals in accordance with the present invention overlapping in the gas phase, for example, and moving equally through the soil profile or column. Conventional equipment does not allow for injection of materials at prescribed intervals in a linear pattern, as in the present invention. Accuracy in delivery of soil fumigants in accordance with the present invention will provide for significantly reduced application rates, reduced worker exposure and greater safety in application and handling, less cost per acre to the grower and significantly reduced emissions of fumigant into the atmosphere.

In accordance with the present invention, fumigation rates, for example, may be reduced by about 40%, and in some cases the reduction may be up to about 50%, depending on soil conditions and other factors, compared to conventional systems for applying fumigants. For example, if injections are made at one foot intervals in accordance with the present invention, as opposed to a conventional continuous flow, then a reduction in the applied rate of 50% can be expected from a traditional bed shank treatment.

The amount of treatment material applied to the soil in accordance with the present invention will vary depending upon the material being applied to the soil, soil conditions, etc. For the fumigant iodomethane, for example, the fumigant may be applied in an amount of preferably about 3 gal/treatment acre to about 12 gal/treatment acre, more preferably 3 gal/treatment acre to about 9 gal/treatment acre, and most preferably about 3 gal/treatment acre to about 6 gal/treatment acre.

Iodomethane, a preferred fumigant for use in the apparatus and method of the present invention, is a colorless liquid at 20° C., and will flow through injection equipment and/or tubing at ambient room temperature. Its solubility in water is 14.2 g/L, such that it can be mixed with water without the use of emulsifiers. Further, iodomethane in the presence of light turns orange-brown and rapidly photodegrades. Its lifetime in the atmosphere is 1.5-4 days, which inhibits it from reaching the ozone layer and therefore iodomethane is classified as a non-ozone depleting compound (the ozone depleting potential of methyl iodide is 0.0015 as reported by Ko, "Estimates of Atmospheric Lifetime, Global Warming Potential and Ozone Depletion Potential of Iodomethane ($CH_3I$)", Executive Summary III, Atmospheric and Environmental Research, Inc. (Report Date Oct. 31, 2000). The corrosiveness of iodomethane to carbon steel has been documented and in some cases iodomethane has been corrosive to poly vinyl chloride (PVC) pipe. Accordingly, there should be the appropriate selection of materials for handling iodomethane, as one skilled in the art would recognize and address in a suitable manner (as discussed below suitable materials for handling iodomethane are commercially available). The volatility of iodomethane is similar to that of methyl bromide. Iodomethane has a Henry's Law Constant of 0.22 compared to 0.24 for methyl bromide, which means that iodomethane, like methyl bromide, will change from a liquid to a gas once it is injected into the soil. The molecular weight of iodomethane is 141.9, and it has a density of 2.28 g/ml. Iodomethane is non-flammable and non-explosive, and it currently finds uses in the fields of medicine, organic synthesis, microscopy, and testing for pyridine.

While not wishing to be bound by theory, it is believed that iodomethane's mode of action as a fumigant is through the bimolecular nucleophilic displacement ($SN_2$) reaction with functional groups such as $NH_2$ and SH, in various amino acids and peptides in target organisms.

In accordance with the present invention, iodomethane can be introduced into the soil as a stand-alone product or in combination with other soil fumigants, e.g. chloropicrin or other products such as biologicals, etc., and it is injected into the soil for control of soil born pests and disease.

Referring now to FIGS. 1-4, the soil injection apparatus in accordance with the present invention is preferably mounted to a vehicle such as a tractor 10 for delivery of the material into the soil. Other vehicles, for example, a pick-up truck, may of course be used to transport the apparatus.

Figure 2:
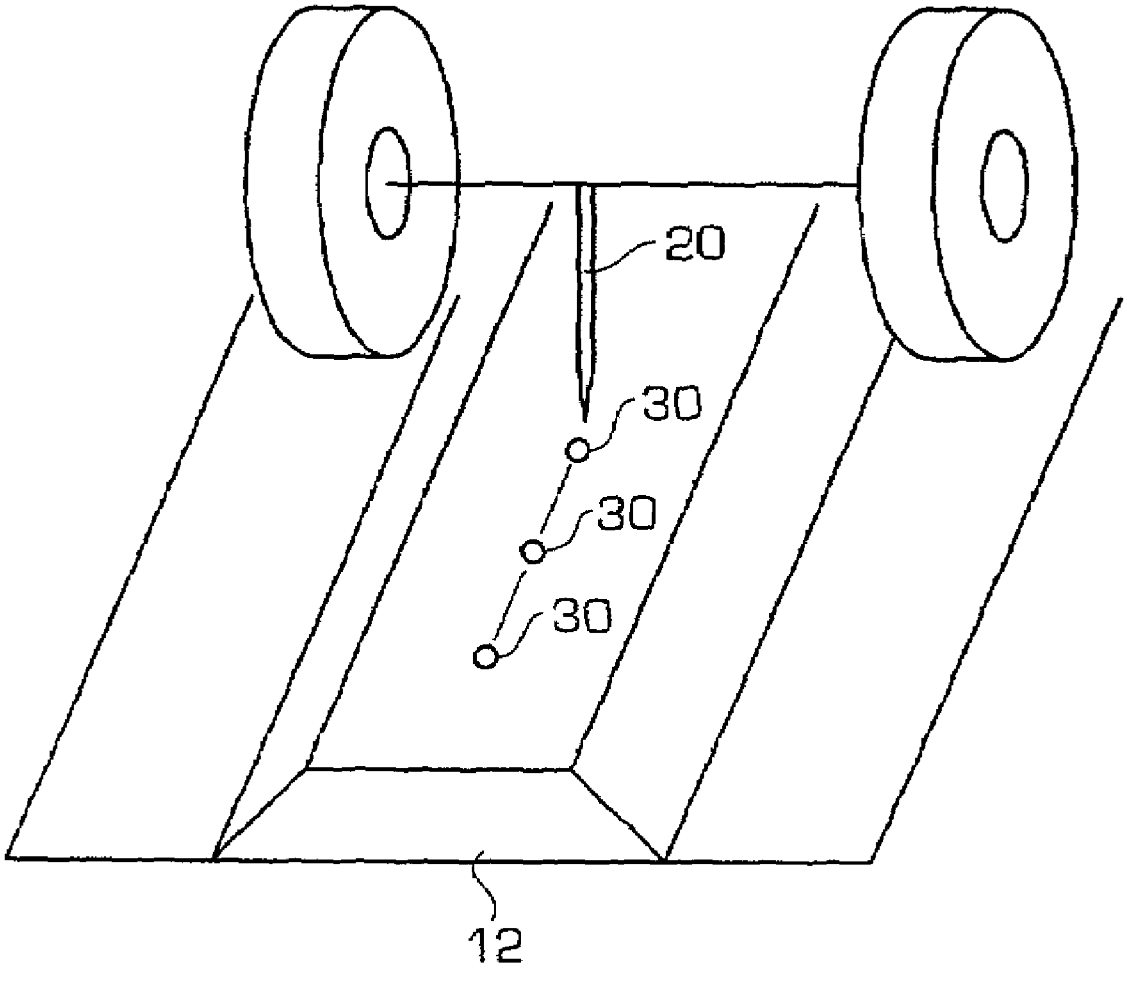
FIG. 2 is a perspective view showing a shank portion of an apparatus for injecting fumigant in accordance with the present invention and several injection points.

As shown in FIG. 2, tractor 10 may be used to make a single pass through soil 12 with shank or shovel 20 allowing for injections of fumigant at points 30 at pre-determined intervals, for example, 6 inches apart along a linear path. The fumigant iodomethane, for example, may be injected into soil in accordance with the present invention at substantially equidistant points in the soil preferably at about 3 to about 12 inches apart, more preferably about 5 to about 12 inches apart and most preferably about 8 to about 12 inches apart.

The shape of shank(s) 20 is not limited, and shank(s) 20 may have any suitable shape provided it allows for injection of material into the soil in accordance with the present invention.

Figure 5:
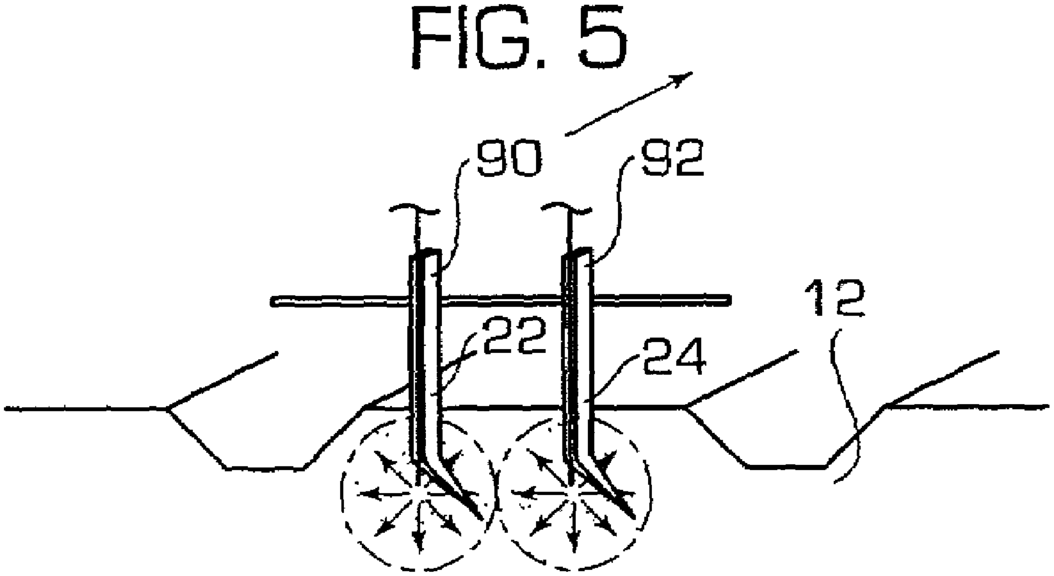
FIG. 5 is a perspective view showing two shanks injecting fumigant into a row of soil in accordance with the present invention as they travel through the soil in the direction of the arrow.

As discussed above, in the case of fumigants containing a volatile ingredient the material enters the soil as a liquid but quickly turns into a gas where it travels in all directions through the soil pore spaces providing control of target organisms within a distinct layer of the soil profile with minimum disturbance to soil structure. This is shown in FIGS. 1 and 5 as diffusion areas 40.

As one skilled in the art will appreciate, the distance between injection intervals is dependent upon the diffusion pattern of the injected material in the soil. These patterns are influenced by soil type, condition and target organism to be controlled. Thus, as described above, the injection points may be anywhere up to about 12 inches apart for iodomethane, but distances between injections of beyond 12 inches even for iodomethane are within the scope of the invention depending upon soil conditions, etc. Further, as will be appreciated from the following, material is injected into the soil only when tractor 10 is in motion and the injection tubes are in the soil, thus maintaining a closed fumigation system to the treatment area.

The depth of the injection sites in accordance with the present invention will vary depending upon soil type and whether the crop to be planted after fumigation is shallow-or deep-rooted. Examples of shallow-rooted crops are strawberries and tomatoes, while deep-rooted crops are trees and vines. For shallow-rooted crops, the depth of injection in accordance with the present invention is preferably about 1 inch to about 12 inches, more preferably about 1 inch to about 8 inches, and most preferably about 1 inch to about 6 inches, below the surface of the soil. For deep rooted crops the depth of injection in accordance with the present invention is preferably about 18 inches to about 24 inches, more preferably about 20 inches to about 24 inches, and most preferably about 22 to about 24 inches, below the surface of the soil.

Figure 3:
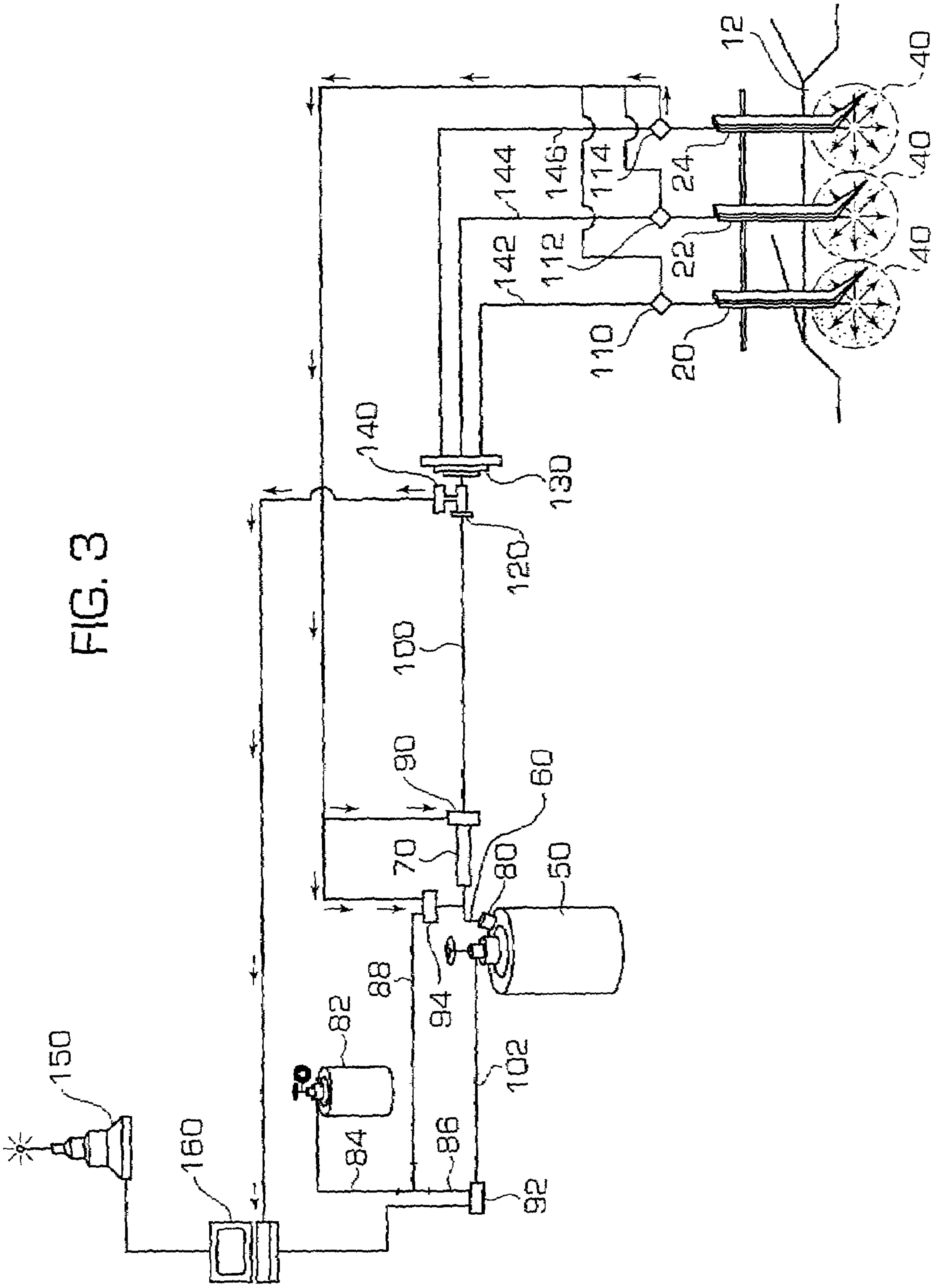
FIG. 3 shows an apparatus suitable for injecting fumigant into soil in accordance with the present invention.

Referring to FIGS. 1 and 3, iodomethane may be stored in a stainless steel or other suitable contained 50 mounted on tool bar 14 or other similar structure attached to, for example, tractor 10. Alternatively, as mentioned above, container 50 may be transported in any other suitable manner, such as by a pick-up truck. Material stored in tank 50 flows through tubing 60 into a reservoir 70. One-way valve or switch 80 at the outlet of container 50 allows material to fill reservoir 70 and also for gas to prime the reservoir, as will be discussed below. A source of compressed gas, such as nitrogen or a similar gas is provided by container 82. Compressed gas flows from contained 82 through tubing 84 to tubing 86 and 88. A solenoid switch 92 is provided to control the flow of compressed gas in line 102 which is connected to tank 50. Similarly, a solenoid switch 94 is provided in tube 88 to control the flow of compressed gassed therethrough to reservoir 70.

Global Position Satellite (GPS) device 150 or a similar device such as a radar device mounted to the apparatus of the present invention tracts movement (speed and location) of the apparatus and inputs this information into computer 160. Other information is also provided by a user to computer 160 including the rate of application of the material, number of nozzles, weight/density of the materials, depth of injection, distance between pulses and target ground speed, and computer 160 provides the appropriate signals to the apparatus, namely solenoid 92 in accordance with programming software previously inputted into computer 160 by one skilled in the art.

Solenoid switch 90 is provided at the outlet to reservoir 70 and opens to allow material to flow through tubing 100 and out through shanks 20, 22, 24, etc. At the appropriate time, gas sensors 100, 112, 114, etc. provide an electrical signal for closing solenoid switches 90 and/or 92 (the electrical signal being shown by the solid and hatched lines in FIG. 3). Orifice plate 120, is provided for regulation of various liquids/gas materials to manifold 130. Flowmeter 140 tracks the rate of flow through tubing 100 and out through tube shank lines 142, 144, 146, etc., to shanks 20, 22, 24, etc. At manifold 130, the material is divided into equal parts for delivery through tube shank lines 140, 142, 144, etc.

A single injection or pulse unit for subsurface soil injection in accordance with the present invention may be operated in the following manner where a single pulse unit is the application or amount of a fertilizer, biological or chemical, such as iodomethane, from a storage tank into the lines and out through shanks placed at a predetermined depth and location in the soil.

First, computer 160 has the following input of data:

1. Rate of Application in amount of material;
2. Number of injection nozzles;
3. Weight/density of the material;
4. Location of treatment area according to GPS coordinates;
5. Depth of injection of shanks;
6. Physical state of material (gas or liquid);
7. Distance between "Pulse Units"; and
8. Ground Speed (Inches/sec).

The equipment is then moved into the treated area and position verified by GPS.

The equipment initiates movement and the computer receives input to initiate a single pulse to the injection system.

Input is received at the solenoid switch 92 to release iodomethane from pressurized storage tank 50 and into reservoir 70. Tank 50 is held at a constant pressure by input line 102 from nitrogen tank 82.

Solenoid switch 92 closes and the exact amount of material for a single pulse is held in reservoir 70.

Solenoid switch 94 is opened to allow nitrogen or compressed air to pressurize the material in reservoir 70. When the desired pressure is reached in reservoir 70, solenoid switch 90 is opened so that the material is released from reservoir 70 and pushed through tubing 100 and out to manifold 130.

At manifold 130, the material is divided into equal amounts depending upon the number of shanks being driven through the soil.

Pressure is still pushing the material from solenoid switch 90 and will distribute the material to each shank tube line 142, 144, 146, etc., and out through each nozzle.

Near the nozzle at the end of each shank tube line 142, 144, 146, etc., there is a gas sensor 110, 112, 114, etc., that determines when the entire amount of material has been expelled from the tubing and then sends a signal to solenoid switch 94 to close and stop the flow of gas.

The equipment continues to travel to the next injection point and is ready for the next injection.

The entire injection apparatus should be a closed system to insure safety to the various personnel involved in mixing, loading and applying the fumigant in accordance the present invention. As discussed above, the material to be applied to the soil may be expelled from the container by either nitrogen compressed gas or similar non-reactive gas. Alternatively, one skilled in the art will recognize that the same result may be achieved by a pump, the pump being a relatively accurate pump. Thus, injections of material into the soil in accordance with the present invention may be made with a positive displacement pump, but of course diaphragm, roller, impeller or other pumps may also be used.

In accordance with the present invention, the quantity of material needed for a single injection may be drawn from the tank. The exact amount drawn is determined by the target rate to be applied/acre taking into consideration the ground speed of the tractor. Ground speed may be determined by radar device 130 mounted on tractor 10 (see, FIG. 1) or in any conventional manner, and transmitted to computer 160 that will regulate the feed of more or less of material from tank 50 to tube line 60.

As iodomethane is pushed through the nozzle opening at the distal end of tube shank lines 142, 144, 146 etc., and injected into the soil in accordance with the present invention, it does not create a fan or spray pattern. Instead, a reservoir of material is deposited to a single point in the soil where it will distribute through the soil and, if desired, overlap with the diffusion pattern or areas of adjacent soil injections. Thus, no special shape of the nozzle is required so long as a suitable injection in accordance with the invention is achieved. However, the nozzle opening may, if desired, be provided with a valve (not shown) such as a shut-off valve operated by, for example, pressure, or any suitable one-way valve to inject the material into the soil but prevent dirt from entering the nozzle.

Figure 4:
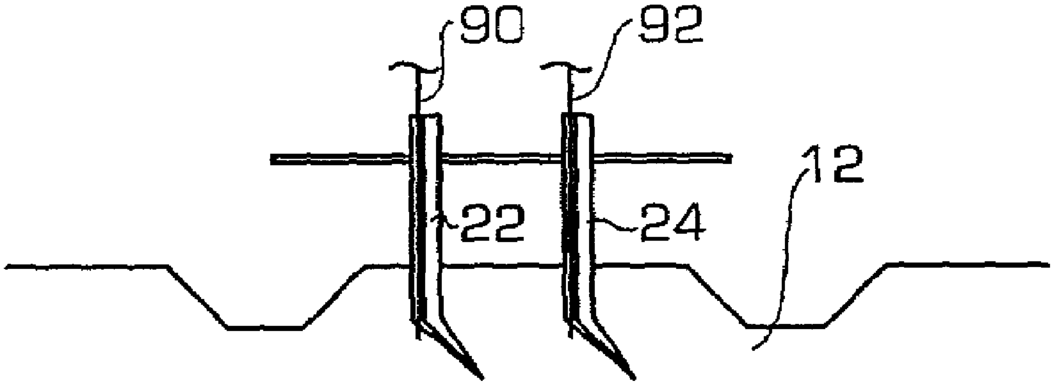
FIG. 4 shows two shanks injecting fumigant into the soil in accordance with the present invention.

In accordance with the present invention, the material is released from nozzles at the end of tube shank lines 142, 144, 146, etc., attached to shanks or shovels 20, 22, 24, etc., at equal intervals as determined by soil type, rate, depth of injection, diffusion pattern and target pests. A single injection depth may be determined and used for each application, with the shanks 20, 22, 24, etc., all being within the same plane. It will be appreciated that the distance between each adjacent shank will depend upon, among other things, the width of the treatment area. A preferred spacing between shanks in connection with the injection of the fumigant iodomethane in accordance with the present invention is about 12 inches, as shown in FIG. 4. Referring to FIG. 4, for a soil bed having a 34 inch width, two shanks spaced about 12 inches apart and about 11 inches from the edges of the bed may be suitable. More generally, for the application of, for example, iodomethane in accordance with the present invention, adjacent shanks may be spaced about 6 inches to about 24 inches apart, more preferably about 8 inches to about 24 inches apart, and most preferably about 12 inches to about 24 inches apart. Of course, spacings of the shanks greater than 24 inches apart, if desirable, are within the scope of the invention. For example, while 20 inch spacings is typical for deep rooted crops, the spacing may be as much as 60 inches apart. Further, tubing 60, 100, 142, 144, 146, etc., for transfer of the material through the system and into the soil should be compatible with the material being injected. In this regard, when injecting iodomethane into soil in accordance with the present invention, tubing material which is durable and will not corrode should be used, as one skilled in the art would recognize. For example, when injecting iodomethane, the tubing may be stainless steel or a perfluoroelastomer or fluoroelastomer, such as Kalrez® or Viton®, respectively, both of which are available from Du Pont Dow Elastomers, LLC of Wilmington, Del.

In accordance with the present invention, the apparatus may be charged with the amount of material needed for a single injection. Thus, priming the entire system is not necessary and, between injections, material may not be present in all the lines. This action makes cleaning of the equipment easier since there is little to none of the material to expel from the lines once the target area has been treated. Nitrogen or compressed air can then be used to rid the lines and to help minimize the potential for exposure typically associated with conventional equipment.

The invention may be better understood with reference to the accompanying example, which is intended for purposes of illustration only and should not be construed as in any sense limiting the scope of the invention as defined in the claims appended hereto.

EXAMPLE

Iodomethane is injected as a fumigant into soil having the following characteristics: pH of 6-8, organic matter-1-3% by wt., % moisture-50-90 (sealed holding capacity), in accordance with the present invention in the following manner in preparation for planting strawberries in the soil.

A container of the apparatus is charged with iodomethane, and the apparatus is positioned at a location in the treatment area whereby 2 shanks are located in the same plane at a depth of 10 inches in a soil bed 38 inches wide, the shanks being spaced 24 inches apart. Based upon information previously inputted into the computerized controls of the apparatus, an amount of 3 ml of iodomethane is drawn from the tank for injection into the soil by all the shanks and placed in a reservoir. Following opening a solenoid switch at the reservoir, this amount of iodomethane then flows through tubing by means of compressed gas to a manifold which distributes the iodomethane equally among 2 shank tube lines, each of which has a nozzle associated with each of the shanks. In this manner, 1.5 ml of iodomethane is injected from each nozzle into the soil where the iodomethane immediately vaporizes into a gas and creates a diffusion pattern in the soil that is either spherical or elliptical in shape, having an effective treatment diameter of about 24 inches. Gas sensors located near the nozzles of the tube shank lines determine when all the iodomethane has been expelled from the shank tubing lines and the solenoid switch opening the reservoir is closed. The apparatus is then moved 12 inches in a straight path to a second position whereat a second injection of iodomethane is carried out by the sequence of iodomethane transfer and valve openings discussed above.

While the present invention has been described with reference to preferred embodiments and illustrative examples, it should be understood that one of ordinary skill in the art after reading the foregoing specification would be able to effect various changes, substitutions of equivalents and modifications to the methods as described herein. Therefore, it is intended that the scope of the invention not be limited by reference to the illustrative example, but rather with reference to the accompanying claims.

What is claimed:

1. A method for applying a product to soil, comprising the steps of:

providing a storage tank, which stores the product, in fluid communication with a reservoir;

providing a plurality of injectors connected to the reservoir by a fluid conveying member, said plurality of injectors being disposed proximate to a plurality of shanks;

priming a discrete, predetermined amount of the product, which is supplied from the storage tank, in the reservoir by a priming member which pressurizes the discrete, predetermined amount of the product in the reservoir to a predetermined pressure level;

releasing the discrete, predetermined amount of the product, which is pressurized in the reservoir at the predetermined pressure level, in response to a control signal; and injecting the discrete, predetermined amount of the product, which is released from the reservoir via the fluid communication member, under pressure at the plurality of injectors, wherein each injector intermittently injects the product at a series of locations in a pass through the soil by priming the discreet, predetermined amount of the product to the predetermined pressure level in the reservoir after each injection point, the product diffusing into the soil from each of the injection points to provide diffusion patterns of the product in the soil, wherein the injecting comprises releasing the discrete, predetermined amount of the product as a single charge of the reservoir, which is pressurized by the priming member, at a point in the soil, the product volatilizing from that point to form a diffusion pattern of the product in the soil that is touching, overlapping or intermittent with diffusion patterns from adjacent points of releasing the product as single charges of the reservoir at the injection points.

2. The method according to claim 1, wherein the product is a fumigant.

3. The method according to claim 1, wherein the series of locations are substantially equidistant.

4. The method according to claim 1, wherein each of the injectors is independently operable.

5. The method according to claim 1, wherein the product is a liquid.

6. The method according to claim 1, wherein the product is a gas.

7. The method according to claim 1, wherein the priming member is a source of compressed gas which forces the discrete, predetermined amount of the product from the reservoir through the fluid conveying member to the plurality of injectors when the discrete, predetermined amount of the product is released in response to the control signal.

8. The method according to claim 1, wherein the priming member is a pump which pressurizes the discrete, predetermined amount of the product in the reservoir to the predetermined pressure level.

9. The method according to claim 1, wherein the plurality of injectors are provided at a distal end of the fluid conveying member and disposed on the plurality of shanks which respectively place the distal end of the fluid conveying member to each injector at a predetermined depth in the soil.

10. The method according to claim 1, wherein the product is iodomethane.

11. A method for applying a product to soil, comprising the steps of:

providing a storage tank, which stores the product, in fluid communication with a reservoir;

providing a plurality of injectors connected to the reservoir by a fluid conveying member, said plurality of injectors being disposed proximate to a plurality of shanks;

priming a discrete, predetermined amount of the product, which is supplied from the storage tank, in the reservoir by a priming member which pressurizes the discrete, predetermined amount of the product in the reservoir to a predetermined pressure level;

releasing the discrete, predetermined amount of the product, which is pressurized in the reservoir at the predetermined pressure level, in response to a control signal; and injecting the discrete, predetermined amount of the product, which is released from the reservoir via the fluid communication member, under pressure at the plurality of injectors, wherein each injector intermittently injects the product at a series of locations in a pass through the soil by priming the discreet, predetermined amount of the product to the predetermined pressure level in the reservoir after each injection point, the product diffusing into the soil from each of the injection points to provide diffusion patterns of the product in the soil wherein the method further comprises determining whether an injection apparatus, which includes the storage tank, the reservoir, the fluid conveying member, the plurality of injectors, and the plurality of shanks, is located at one of a plurality of injection points in the pass through the soil, wherein the reservoir is controlled by the control signal to release the discrete, predetermined amount of the product if the injection apparatus is determined to be located at one of the plurality of injection points in the pass through the soil, wherein release of the discrete, predetermined amount of the product is prevented if the injection apparatus is determined to be located between injection points, wherein the determining whether the injection apparatus is located at one of the plurality of injection points is determined by a global positioning satellite (GPS) sensor provided on the injection apparatus and the discrete, predetermined amount of the product is injected if the GPS sensor indicates that the injection apparatus is located at an injection point among the plurality of injection points.

12. The method according to claim 11, wherein the product is a fumigant.

13. The method according to claim 11, wherein the product is iodomethane.

14. The method according to claim 11, wherein the injecting comprises releasing the discrete, predetermined amount of the product as a single charge of the reservoir, which is pressurized by the priming member, at a point in the soil, the product volatilizing from that point to form a diffusion pattern of the product in the soil that is touching, overlapping or intermittent with diffusion patterns from adjacent points of releasing the product as single charges of the reservoir at the injection points.

15. The method according to claim 11, wherein the plurality of injectors are provided at a distal end of the fluid conveying member and disposed on the plurality of shanks which respectively place the distal end of the fluid conveying member to each injector at a predetermined depth in the soil.

16. A method for applying a product to soil, comprising the steps of:

providing a storage tank, which stores the product, in fluid communication with a reservoir;

providing a plurality of injectors connected to the reservoir by a fluid conveying member, said plurality of injectors being disposed proximate to a plurality of shanks;

priming a discrete, predetermined amount of the product, which is supplied from the storage tank, in the reservoir by a priming member which pressurizes the discrete, predetermined amount of the product in the reservoir to a predetermined pressure level;

releasing the discrete, predetermined amount of the product, which is pressurized in the reservoir at the predetermined pressure level, in response to a control signal; and injecting the discrete, predetermined amount of the product, which is released from the reservoir via the fluid communication member, under pressure at the plurality of injectors, wherein each injector intermittently injects the product at a series of locations in a pass through the soil by priming the discreet, predetermined amount of the product to the predetermined pressure level in the reservoir after each injection point, the product diffusing into the soil from each of the injection points to provide diffusion patterns of the product in the soil, wherein the product is a fumigant, wherein the product is applied to the soil in a quantity from about 3 gal/treatment acre to about 12 gal/treatment acre.

17. The method according to claim 16, wherein the product is iodomethane.

18. The method according to claim 16, wherein the priming member is a source of compressed gas which forces the discrete, predetermined amount of the product from the reservoir through the fluid conveying member to the plurality of injectors when the discrete, predetermined amount of the product is released in response to the control signal.

19. The method according to claim 16, wherein the plurality of injectors are provided at a distal end of the fluid conveying member and disposed on the plurality of shanks which respectively place the distal end of the fluid conveying member to each injector at a predetermined depth in the soil.

* * * * *